(12) United States Patent
Zhang et al.

(10) Patent No.: US 8,767,575 B2
(45) Date of Patent: Jul. 1, 2014

(54) METHOD AND APPARATUS FOR BROADBAND CARRIER FREQUENCY AND PHASE RECOVERY IN COHERENT OPTICAL SYSTEM

(75) Inventors: Zhuhong Zhang, Ottawa (CA); Chuandong Li, Ottawa (CA); Fei Zhu, San Jose, CA (US); Yusheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 284 days.

(21) Appl. No.: 13/204,290

(22) Filed: Aug. 5, 2011

(65) Prior Publication Data

US 2012/0033965 A1 Feb. 9, 2012

Related U.S. Application Data

(60) Provisional application No. 61/371,420, filed on Aug. 6, 2010.

(51) Int. Cl.
| | |
|---|---|
| *G01R 31/08* | (2006.01) |
| *H04B 10/61* | (2013.01) |
| *H04L 7/00* | (2006.01) |
| *H04L 7/02* | (2006.01) |
| *H04L 7/027* | (2006.01) |
| *H04L 1/24* | (2006.01) |
| *H04L 7/04* | (2006.01) |
| *H04L 7/08* | (2006.01) |
| *H04L 25/02* | (2006.01) |
| *H04L 25/03* | (2006.01) |
| *H04W 24/02* | (2009.01) |

(52) U.S. Cl.
CPC ........ *H04B 10/6164* (2013.01); *H04B 10/6165* (2013.01); *H04L 1/242* (2013.01); *H04L 7/0054* (2013.01); *H04L 7/02* (2013.01); *H04L 7/027* (2013.01); *H04L 7/04* (2013.01); *H04L 7/041* (2013.01); *H04L 7/08* (2013.01); *H04L 25/0202* (2013.01); *H04L 25/022* (2013.01); *H04L 25/0222* (2013.01); *H04L 25/03828* (2013.01); *H04W 24/02* (2013.01); *H04W 56/0038* (2013.01)
USPC ........................................ 370/252

(58) Field of Classification Search
CPC .......... H04B 10/6164; H04B 10/6165; H04L 1/242; H04L 7/0054; H04L 7/02; H04L 7/027; H04L 7/04; H04L 7/041; H04L 7/08; H04L 25/0202; H04L 25/022; H04L 25/0222; H04L 25/03828; H04W 24/02; H04W 56/0035
USPC .......................... 370/252, 254, 480, 481, 484
See application file for complete search history.

(56) References Cited

U.S. PATENT DOCUMENTS

| | | | | |
|---|---|---|---|---|
| 4,648,060 | A * | 3/1987 | Allen et al. | 708/845 |
| 6,381,388 | B1 | 4/2002 | Epworth et al. | |
| 7,596,323 | B1 * | 9/2009 | Price et al. | 398/141 |
| 7,606,498 | B1 | 10/2009 | Wu et al. | |
| 2002/0106009 | A1 * | 8/2002 | Harrison | 375/219 |
| 2004/0091066 | A1 | 5/2004 | Noe | |
| 2004/0196928 | A1 * | 10/2004 | Hessel | 375/340 |
| 2006/0239370 | A1 * | 10/2006 | Mody et al. | 375/260 |
| 2006/0251190 | A1 * | 11/2006 | Wang et al. | 375/330 |
| 2007/0129042 | A1 * | 6/2007 | Kristensson et al. | 455/296 |
| 2008/0175594 | A1 | 7/2008 | Bai et al. | |
| 2008/0310566 | A1 * | 12/2008 | Tsuruta et al. | 375/350 |
| 2009/0103633 | A1 | 4/2009 | Zhang | |
| 2009/0142076 | A1 | 6/2009 | Li et al. | |
| 2009/0257755 | A1 * | 10/2009 | Buelow | 398/184 |
| 2009/0290663 | A1 * | 11/2009 | Elsayed et al. | 375/344 |
| 2010/0021163 | A1 | 1/2010 | Shieh | |
| 2010/0026564 | A1 * | 2/2010 | Kolmhofer | 342/203 |
| 2010/0329683 | A1 * | 12/2010 | Liu | 398/81 |
| 2011/0305453 | A1 * | 12/2011 | Hauske et al. | 398/38 |

FOREIGN PATENT DOCUMENTS

| | | |
|---|---|---|
| CN | 101415080 A | 4/2009 |
| CN | 101453269 A | 6/2009 |

OTHER PUBLICATIONS

Foreign Communication Related to a Counterpart Application, PCT Application PCT/CN2011/078100, International Search Report dated Nov. 24, 2011, 3 pages.

Kazovsky, L, et al., "Phase and Polarization Diversity Coherent Optical Techniques," Journal of Lightwave Technology, vol. 7, No. 2, Feb. 1989, 14 pages.

Noe, R., et al., "Phase Noise Tolerant Synchronous QPSK/BPSK Baseband-Type Intradyne Receiver Concept With Feedforward Carrier Recovery," Journal of Lightwave Technology, vol. 23, No. 2, Feb. 2005, 7 pages.

\* cited by examiner

*Primary Examiner* — Mark Rinehart
*Assistant Examiner* — Peter Cheng

(74) *Attorney, Agent, or Firm* — Conley Rose, P.C.; Grant Rodolph; Jonathan K. Polk

(57) ABSTRACT

A digital apparatus comprising a fast Fourier transform (FFT) module configured to transform a time domain optical signal into a frequency domain optical signal, a circular shifter coupled to the FFT module and configured to provide coarse frequency offset compensation to the frequency domain optical signal based on an estimated frequency offset; and a frequency offset estimation module coupled to the circular shifter and configured to provide the estimated frequency offset based on a power spectrum of the frequency domain optical signal or a data block header autocorrelation of the time domain optical signal.

20 Claims, 13 Drawing Sheets

METHOD AND APPARATUS FOR BROADBAND CARRIER FREQUENCY AND PHASE RECOVERY IN COHERENT OPTICAL SYSTEM

CROSS-REFERENCE TO RELATED APPLICATIONS

The present application claims priority to U.S. Provisional Patent Application Ser. No. 61/371,420, filed Aug. 6, 2010 by Zhuhong Zhang, et al., and entitled "Method and Apparatus for Broadband Carrier Frequency and Phase Recovery in Coherent Optical System", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In modern day optical communication systems, a dichotomy exists between systems that use direct detection to receive optical signals (direct detection optical systems) and systems that use coherent detection to receive optical signals (coherent optical systems). Direct detection optical systems may modulate data onto the carrier wavelength using either intensity modulation (e.g., varying the instantaneous power of the carrier signal according to the data signal) or frequency modulation (e.g., varying the instantaneous frequency of the carrier signal). Because only one component of the carrier signal is manipulated, direct detection optical systems may employ relatively straightforward modulation schemes, such as basic forms of amplitude shift keying (ASK) and frequency shift keying (FSK) modulation. For instance, On-Off keying (OOK) may be a simple type of ASK modulation where the intensity of the carrier wavelength is varied between a high threshold and a low threshold to communicate logical ones and logical zeros. Direct detection optical systems may be implemented at a reduced cost, but may not be optimal for all networks, e.g., may not satisfy the performance demands for some applications.

In contrast, coherent optical systems may modulate data onto the carrier wavelength using phase modulation, e.g., instead of or in addition to intensity modulation and/or frequency modulation, to achieve increased receiver sensitivity and/or increased spectral efficiency over direct detection optical systems. Specifically, coherent optical systems may achieve increased spectral efficiency through the implementation of more sophisticated modulation schemes, such as Phase Shift Keying (PSK) modulation (e.g., modulating the instantaneous phase of the carrier signal according to the data signal) as well as derivations thereof, e.g., Differential PSK (DPSK), Binary phased shift keying (BPSK), etc.

SUMMARY

Disclosed herein is an apparatus comprising a fast Fourier transform (FFT) module configured to transform a time domain optical signal into a frequency domain optical signal, a circular shifter coupled to the FFT module and configured to provide coarse frequency offset compensation to the frequency domain optical signal based on an estimated frequency offset; and a frequency offset estimation module coupled to the circular shifter and configured to provide the estimated frequency offset based on a power spectrum of the frequency domain optical signal or a data block header autocorrelation of the time domain optical signal.

Also disclosed herein is a method of frequency correction and carrier recovery in an optical network, the method comprising estimating, by a frequency domain equalizer (FDEQ), a first coarse frequency offset of a quadrature (Q) component signal and a second coarse frequency offset of an in-phase (I) component signal in the frequency domain; removing, by the FDEQ, a first coarse frequency offset from the Q component signal and a second coarse frequency offset from the I component signal; combining, by a multiple-input and multiple-output (MIMO) and finite impulse response (FIR) device, the Q component signal and the I component signal to provide an optical signal; estimating, by a carrier phase recovery and correction component, a fine frequency offset of the optical signal in the time domain; removing, by the carrier phase recovery and correction component, the fine frequency offset from the optical signal; and recovering, by the carrier phase recovery and correction component, the phase of the optical signal after removing the fine frequency offset from the optical signal.

Also disclosed herein is a method comprising removing, by a frequency domain equalizer (FDEQ), a first coarse local oscillator (LO) frequency from a quadrature (Q) component signal and a second coarse LO frequency from an in-phase (I) component signal; and removing a fine frequency LO offset from an orthogonal polarization component signal, wherein the orthogonal polarization component signal comprises a combination of the Q component signal and the I component signal.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
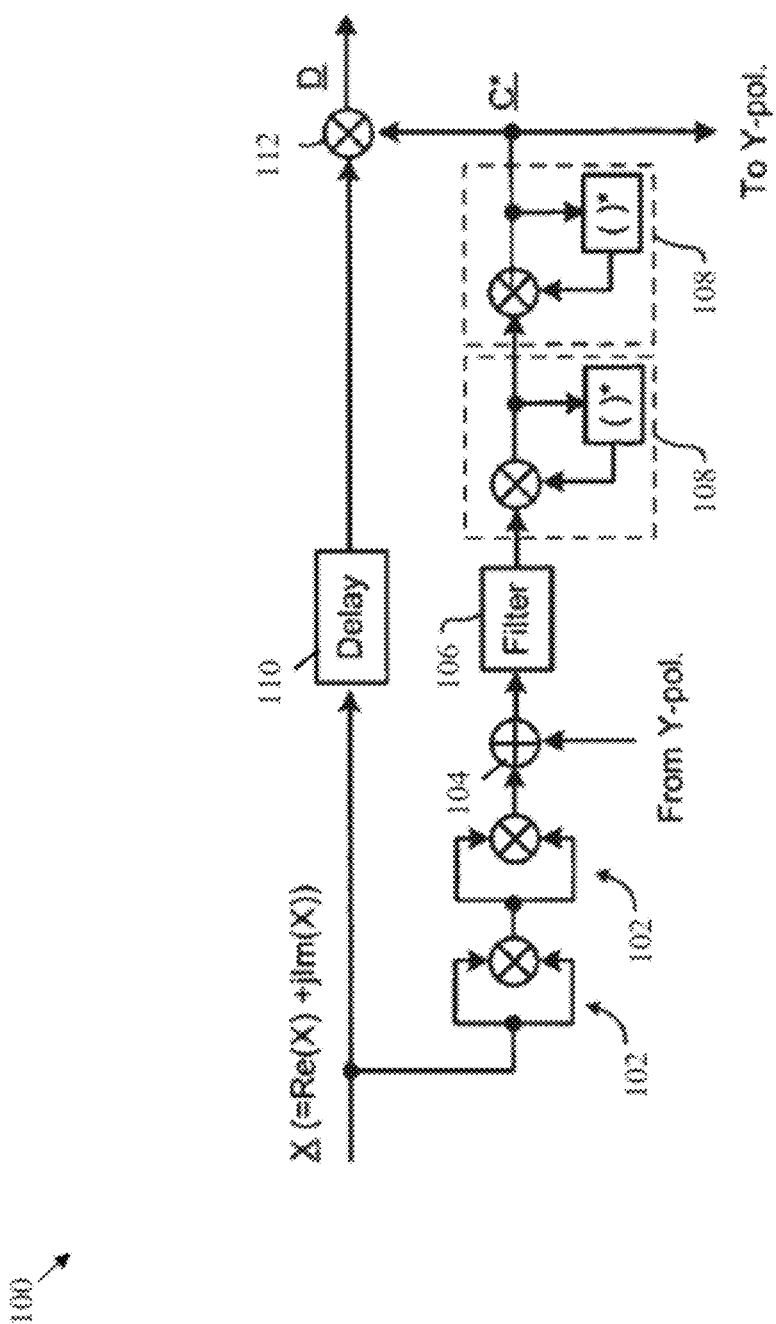
FIG. 1 is a schematic diagram of an embodiment of a carrier phase recovery receiver.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In addition, receivers in coherent optical networks may be capable of differentiating between optical signals having orthogonal polarizations. Phase and polarization diversity coherent optical systems have been previously introduced in the Optical Society of America (OSA) Journal of Lightwave Technology (JLT) Vol. 7, No. 2 entitled "Phase and Polarization-Diversity Coherent Optical Techniques" by L. G. Kazovsky (1989), which is incorporated herein by reference as if reproduced in its entirety. Polarization multiplexed coherent optical networks may use one wavelength to carry two optical signals that have substantially orthogonal linear polarization states. As such, polarization multiplexed coherent optical systems may implement relatively more sophisticated modulation schemes, e.g., Quadrature PSK (QPSK) or Differential QPSK (DQPSK), to achieve even further increases in spectral efficiency.

However, coherent detection of QPSK signals may be more complex than detection of non-phase modulated signals (e.g., direct detections of an OOK signal), and hence may be more difficult to implement in practice. For instance, coherent detection generally requires mixing the carrier signal with a local oscillator (LO) signal whose frequency and phase components are (at least ideally) substantially synchronized to that of the carrier signal. However, in practical applications, synchronizing and aligning the LO's frequency and/or phase may be a non-trivial endeavor, as the LO and the carrier signals are generated independently from one another, e.g., generated using independent sources. Further, when a substantial difference exists between the phase and/or frequency of the LO and carrier signals, the quality of service for the optical communication may be significantly reduced, e.g., resulting in higher signal-to-noise (SNR) ratios, higher bit-error-rates (BERs), etc. As such, coherent receivers may tune, or attempt to tune, the LO's frequency and/or phase to substantially or approximately match that of the carrier signal; a task that may be difficult due to an unstable carrier frequency and/or phase resulting from imperfections in the optical fiber and/or non-ideal network components (e.g., noise resulting from the laser source, filters, amplifiers, etc.).

Specifically, the carrier signal may become distorted while propagating through the optical channel due the culmination of one or more signal impairments, e.g., chromatic dispersion, non-linear phase noise, polarization mode dispersion (PMD), polarization dependent loss (PDL), polarization dependent gain (PDG), polarization rotation, optical white Gaussian noise, etc. To compensate for such irregularities, coherent receivers may employ carrier recovery (CR) circuits to estimate changes in the carrier signal's frequency and/or phase. However, conventional CR methods may have difficulty predicting non-linear and/or sporadic shifts in the carrier signal's phase and/or frequency, which may be referred to as carrier phase uncertainty and carrier frequency offset (respectively). For instance, carrier phase uncertainty and/or carrier frequency offset may result from non-zero phase noise generated by the laser source, nonlinear phase modulation occurring in the propagation channel, a frequency mismatch between the carrier and the LO, parallel processing irregularities, loop delay resulting from carrier recovery implementation, or combinations thereof. Specifically, when phase error reaches about $\pi/4$ for QPSK and about $\pi/2$ for BPSK, a cycle slip may occur and result in errors for every symbol following the cycle slip. Prior art solutions for tracking non-linear and/or sporadic carrier frequency and phase may be unreliable at compensating for nonlinear phase errors and/or difficult to implement in hardware (e.g., may not be hardware feasible). As such, a reliable, hardware feasible, method for tracking carrier frequency and phase in coherent optical systems is needed.

One method for tracking carrier frequency and phase in coherent optical systems was proposed by R. Noe in "Phase Noise-Tolerant Synchronous QPSK/BPSK Baseband-Type Intradyne Receiver Concept with Feedforward Carrier Recovery", Journal of Lightwave Technology, Vol. 23, No. 2, 2005, which is incorporated herein by reference as if reproduced in its entirety. FIG. 1 illustrates a phase recovery receiver 100 for implementing a feed-forward carrier recovery method. The phase recovery receiver 100 may comprise about two cascaded frequency doublers 102, a coupler 104, a filter 106, about two cascaded frequency dividers 108, a delay circuit 110, and a mixer 112, which may be arranged as shown in FIG. 1. The cascaded frequency doublers 102 may achieve a fourth power calculation for an X polarization component of a QPSK signal, where the data phases of the symbols may be removed. The coupler 104 may then couple the output of the cascaded frequency doublers 102 with a Y polarization component of the signal. The filter 106 may then remove a broadband noise from the output signal of the coupler 104. The cascaded frequency dividers 108 may then divide the frequency of the output of the filter 106 by about four to obtain a complex recovered signal C*. The signal C* may then be mixed by the mixer 112 with the X polarization component of the signal, which may be delayed appropriately by the delay circuit 110, to generate a complex baseband signal D with phase recovery.

The carrier phase recovery receiver 100 may have two limitations in terms of digital implementation. The first limitation corresponds to the complexity of hardware implementation that involves fourth power calculation and relatively high heat dissipation of a non-causal filter using memory. The second limitation corresponds to the lack of a solution for the inherently about 90 degrees phase ambiguity that leads to about $\pi/4$ phase errors, such as cycle slip. Thus, the carrier phase recovery receiver 100 may only be suitable for differential coded QPSK applications.

Figure 2:
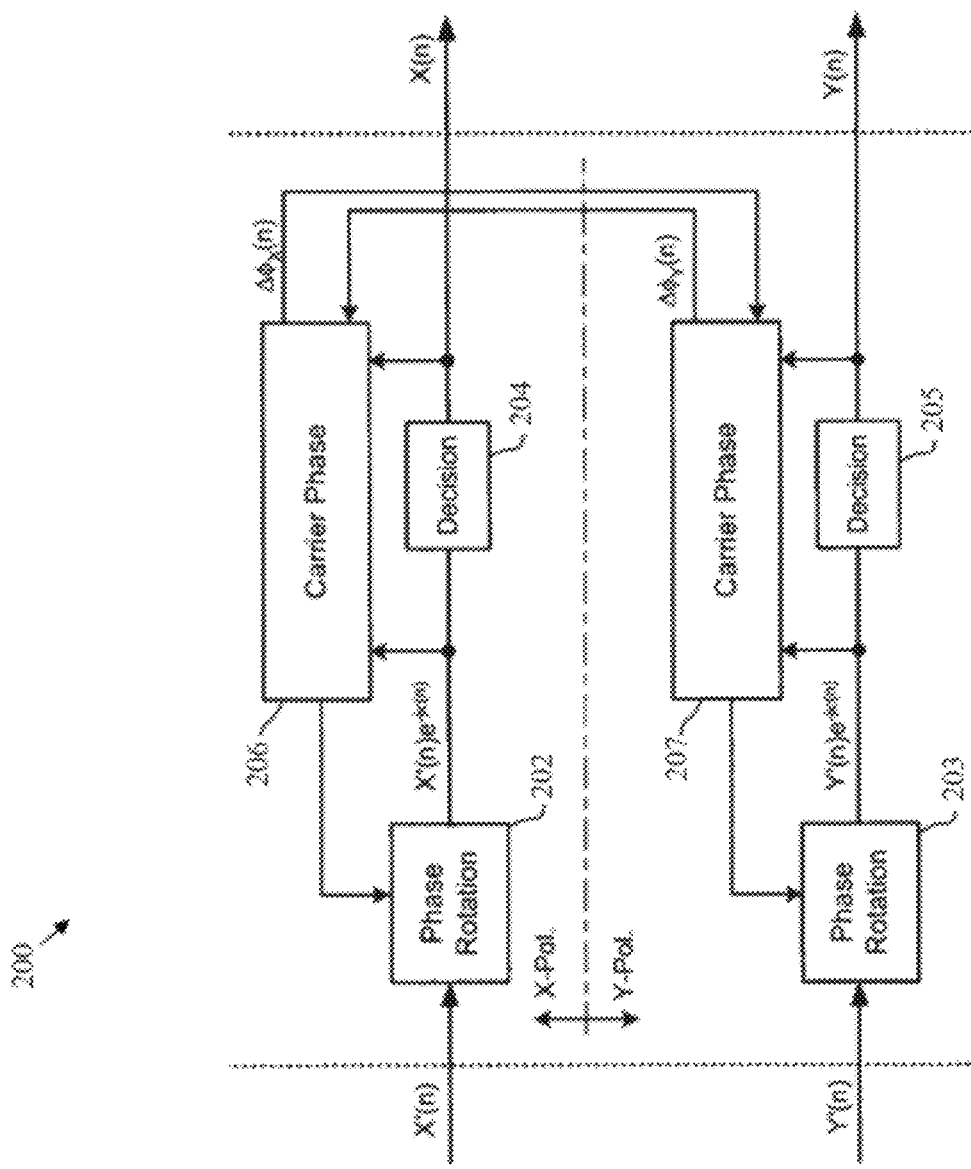
FIG. 2 is a schematic diagram of another embodiment of a carrier phase recovery receiver.

FIG. 2 shows another carrier phase recovery receiver 200 that was proposed in U.S. Pat. No. 7,606,498 by K. Wu (Wu) and entitled, "Carrier Recovery in a Coherent Optical Receiver," which is incorporated herein by reference. The phase recovery receiver 200 may comprise a first phase rotation circuit 202, a first decision circuit 204, and a first carrier phase circuit 206, which may all operate on an X polarization component of a QPSK signal. The phase recovery receiver 200 may also comprise a second phase rotation circuit 203, a second decision circuit 205, and a second carrier phase circuit 207, which may all operate on a Y polarization component of the QPSK signal. The components of the carrier phase recovery receiver 200 may be arranged as shown in FIG. 2. The carrier phase error may be determined by the difference between the input and output of the first decision circuit 204 (for the X component) and similarly of the second decision circuit 205 (for the Y component). A second order feedback Phase-Locked-Loop (PLL) between the first carrier phase circuit 206 and the second carrier phase circuit 207 may be used to track carrier phase.

Wu partitioned transmitted data into continuous data blocks and inserted known symbols in the beginning of each data block. The transmitted data may be received by the carrier phase recovery receiver 200, where the known symbols are used to estimate the carrier phase at the beginning of each data block to avoid decision error. This method may be capable of decoding QPSK but inherently relies on the known symbols to avoid an about $\pi/4$ phase error, which may result in block errors where all the symbols are interpreted as lying in an adjacent quadrant. As such, this method requires that the length of known symbols be long enough to minimize the error probability. This may reduce the bandwidth of the signal and thus may require using more expensive higher bandwidth lasers. Further, this method may not provide solution once the phase error occurs. As such, neither the carrier phase recovery receiver 100 nor the carrier phase recovery receiver 200 may be capable of compensating for nonlinear phase errors.

Disclosed herein is a method and apparatus for relatively wide range, e.g., of about +/−three Gigahertz (GHz), carrier frequency and phase recovery (CFPR) in coherent optical systems. The CFPR method may comprise three stages: a first stage of coarse frequency recovery in the frequency domain; a second stage of fine frequency recovery in the time domain; and a third stage of carrier phase recovery, e.g., using a phase lock loop. Specifically, the first stage of coarse frequency recovery may comprise estimating the coarse frequency offset in the frequency domain, e.g., based on the header of the optical signal, and then applying circular shifting to remove the coarse frequency offset. In an embodiment, the coarse frequency offset may be estimated either prior to or after chromatic dispersion compensation, and may achieve a significant reduction in the total frequency offset of the optical signal, e.g., may decrease the frequency offset from about +/−3 GHz to about +/−600 Megahertz (MHz). When the coarse frequency offset estimation occurs prior to chromatic dispersion compensation, the coarse frequency offset may be estimated by performing a digital frequency sweep while monitoring the total power spectrum component of the header to determine an estimated coarse frequency offset between a lower side band and the peak. When the coarse frequency offset estimation occurs after chromatic dispersion compensation, the coarse frequency offset may be estimated by performing a time-domain autocorrelation of the header (e.g., which may contain a unique word known to the coherent receiver).

The second stage of fine frequency recovery may comprise estimating the fine frequency offset in the time domain based on a calculated phase derivative for a header of the data block or a residual power calculation for the header of the data block. The fine frequency recovery may further decrease the overall frequency offset, e.g., from about +/−600 MHz to about +/−25 MHz, where +/−25 MHz may be a negligible and/or tolerable frequency offset for coherent detection in some systems. Finally, the third step of carrier phase recovery may employ a phase ramping and phase rotation in a phase locked loop to substantially correct and recover the carrier signal's phase.

Figure 3:
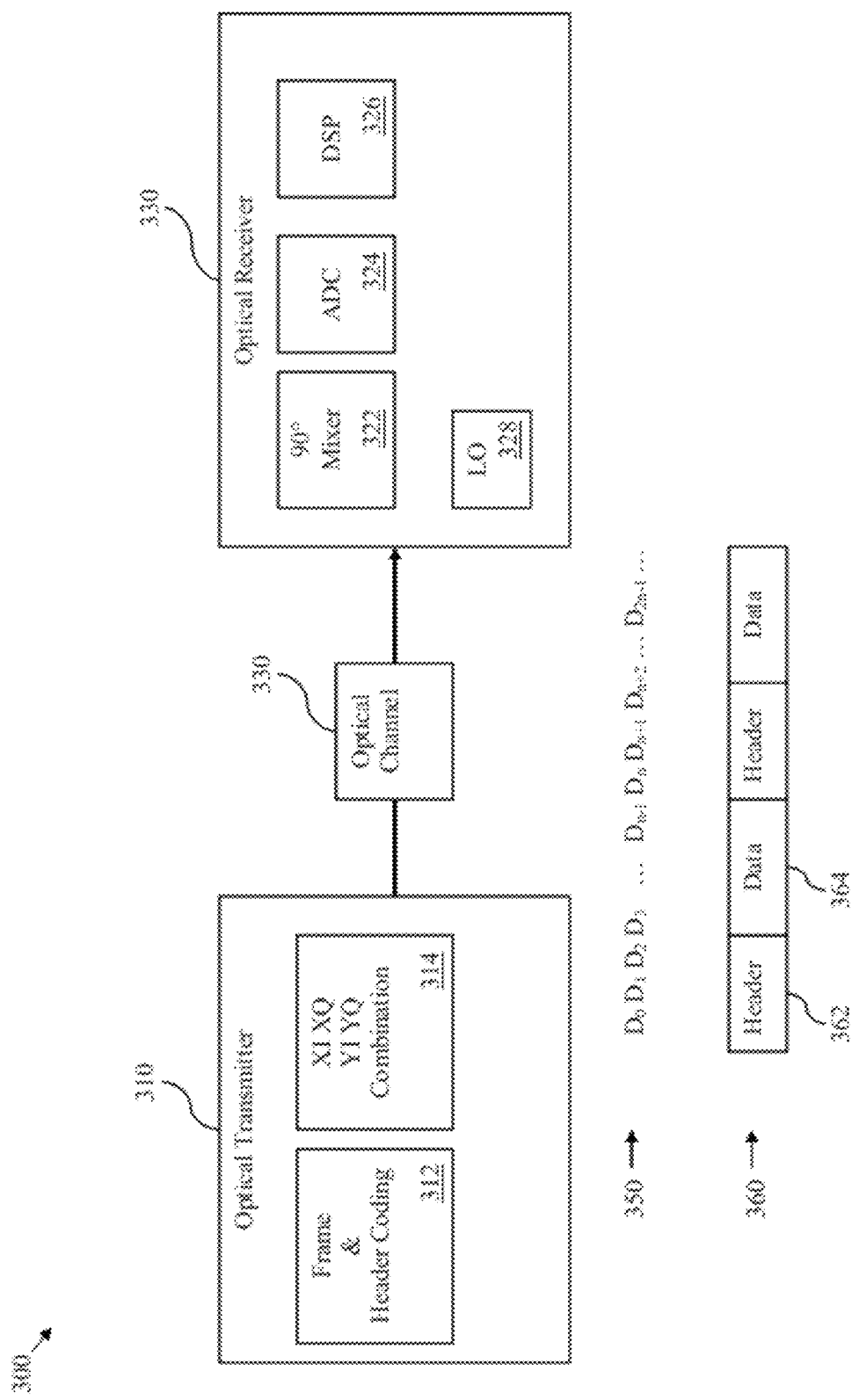
FIG. 3 is a schematic diagram of an embodiment of a coherent optical communications system.

FIG. 3 illustrates one embodiment of a phase modulated (PM) coherent optical communications system 300, which may implement carrier frequency and phase recovery. The PM coherent optical communications system 300 may comprise a transmitter 310, a receiver 320, and an optical channel 330. The transmitter 310 may be coupled to the receiver 320 via the optical channel 330, which may be arranged as shown in FIG. 3. The PM coherent optical communications system 300 may use a PSK modulation scheme, such as QPSK.

The transmitter 310 may comprise a frame and header coding unit 312 and a signal combination block or multiplexer 314 coupled to the frame and header coding unit 312. The frame and header coding unit 312 may be configured to encode and/or encapsulate a transmission data signal 350 into a plurality of data frames 360. Specifically, each of the plurality of data frames 360 may comprise about n symbols (where n is an integer greater than 1) that may be structured as a header 362 and a payload 364. The header 362 may comprise a unique sequence of bits (a unique word) that provides a means for determining (e.g., calculating) the starting phase of each data block. In an embodiment, the unique word may be zero padded in the header, and the header may be considered as one QPSK symbol spinning at a rate equal to about one-fourth the signal frequency. The frame and header coding unit 312 may insert the appropriate headers into the appropriate frames, and subsequently forward the PM optical signal to the multiplexer 314 in a plurality of parallel data streams, e.g., about ten data streams.

The multiplexer 314 may be configured to convert the incoming parallel data streams into a plurality of component signals, e.g., about four component signals, and then forward the component signals to the receiver 320 via the optical channel 330. As such, the rate of the component signals (e.g., symbol rate) may be equal to about a quarter of the rate of the original PM optical signal. The component signals of the PM optical signal may be transmitted using a non return to zero (NRZ) or return to zero (RZ) modulation format and may have about the same carrier frequency, e.g., the same optical wavelength. The carrier frequency may be an optical wavelength provided by a laser (not shown) and may comprise phase noise. The component signals may comprise about two orthogonal phase components, e.g., an in-phase (I) component and a quadratic-phase (Q) component, for each of two orthogonal polarization components, e.g., an X polarization component and a Y polarization component. As such, the transmitter 310 may transmit about four components, e.g., XI, XQ, YI, and YQ, which may be combined and transmitted via the optical channel 330 to the receiver 320. The data blocks in the transmitted PM optical signal may correspond to the different component signals, which may be indicated by polarization information in the blocks, e.g., the blocks' headers.

The optical channel 330 may be configured to transport the PM optical signal from the transmitter 310 to the receiver 320 and, as such, may comprise a plurality of optical fibers, optical filters, amplifiers, or combinations thereof. Such components of the optical channel 330 may introduce undesired signal changes, such as chromatic dispersion, nonlinear phase noise, PMD, PDL, PDG, polarization rotation, optical white Gaussian noise, or combinations thereof.

The receiver 320 may comprise a 90 degrees mixer 322, an analog to digital converter (ADC) 324, a digital signal processor (DSP) 326, and a LO 328. The 90 degrees mixer 322 may be coupled to ADC 324 and the LO 328, and the ADC 324 may be coupled to the DSP unit 326. The 90° mixer 322 may comprise an about 90 degrees optical cross network mixer and a photodetector, e.g., a p-type/intrinsic/n-type (PIN) diode and may be configured to mix the received orthogonal components of the optical signal from the transmitter 310 and split the signal into a plurality of signals, where each signal may be a combination of the orthogonal component signals. The 90° mixer 322 may mix the received optical component signals with an optical signal from the LO 328 that may have a close or about the same carrier frequency of the transmitted optical signal. The output mixed signals from the 90° mixer 322 may then be converted by the ADC 324 (e.g., from analog to digital) and forwarded to the DSP unit 326, which may be configured to process the signals and recover the data in the transmitted signal. The DSP unit 326 may process the signals and recover the transmitted data in the signals. The DSP unit 326 may also be configured for frequency offset correction and carrier phase recovery, as described in detail below. The DSP unit 326 may also separate the data blocks that correspond to the different component signals, e.g., by detecting the polarization information in the blocks, e.g., the blocks' headers.

Figure 4:
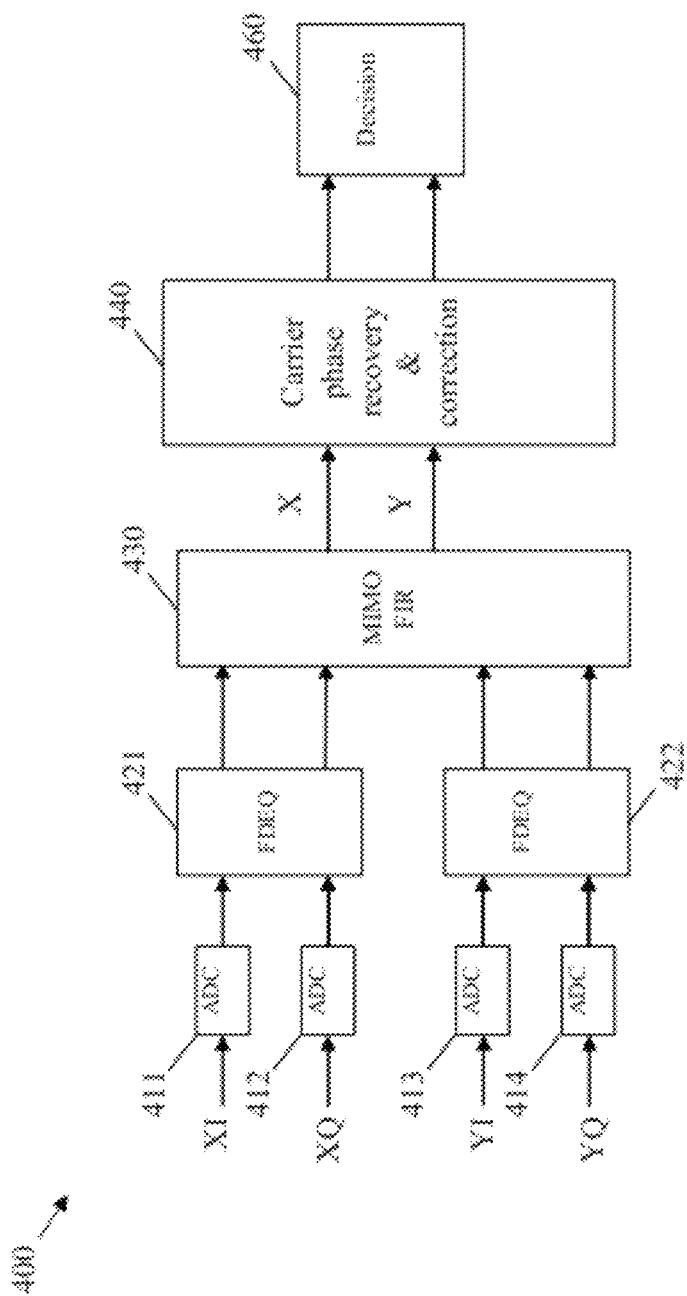
FIG. 4 is a schematic diagram of an embodiment of a DSP receiver.

FIG. 4 illustrates an embodiment of a DSP receiver unit 400 that may be configured to implement a three stage CFPR method. The DSP receiver unit 400 may correspond to the DSP unit 326 in the PM coherent optical communications system 300, and may comprise about four ADCs 411-414, about two frequency domain equalizers (FDEQs) 421-422, a multiple-input and multiple-output (MIMO) and finite impulse response (FIR) block 430, a carrier phase recovery and correction module 440, and a decision circuit 460, which may be arranged as shown in FIG. 4.

The receiver DSP unit 400 may receive a quadrature (Q) component and an in-phase (I) component for each of the two polarization components (X and Y), where each component signal may be received via a corresponding one of the ADCs 411-414. For example, the ADC 411 may receive an XQ component signal, the ADC 412 may receive an XI component signal, the ADC 413 may receive a YQ component signal, and the ADC 414 may receive a YI component signal. The ADCs 411-414 may perform an analog to digital conversion on the component signals, and forward the digital component signals to the FDEQs 421-422.

The FDEQs 421-422 may be any devices that are configured to receive the component signals from the ADCs 411-414 and perform signal conditioning, e.g., to compensate for chromatic dispersion or other signal distortions in the component signals. In an embodiment, the FDEQ 421 may receive the XQ and XI competent signals, and the FDEQ 422 may each receive the YQ and YI component signals. The FDEQs 421-422 may also perform coarse frequency estimation/correction in the frequency domain, as described in greater detail below. Subsequent to performing coarse frequency correction, the FDEQs 420 may send the component signals to the MIMO and FIR block 430.

The MIMO and FIR block 430 may comprise a MIMO equalizer that receives the data blocks in the component signals and processes the data blocks to improve carrier frequency and/or phase estimation, e.g., by implementing a sequence loop. The initial phase may be estimated based on known symbols in the signals, for instance by subtracting a known symbol phase of a signal from the received sample's phase. As such, the symbols may be placed or aligned correctly and phase ambiguity may be substantially eliminated. The MIMO and FIR block 430 may also comprise a plurality of FIRs that may be configured to separate the data blocks of the different polarized signals received from the FDEQs 420. At the output of the MIMO and FIR block 430, the digital samples in the signals may be compensated for phase distortions, e.g., caused by the optical channel, but without necessarily removing carrier phase divergences or misalignments in the signal samples. At the output of the MIMO and FIR block 430, the phase for each sample may comprise a PSK data phase, the laser phase noise, LO frequency offset, Gaussian noise, and/or nonlinear noise. To recover the carrier phase of the originally transmitted signal, carrier phase may be corrected in the carrier phase recovery and correction module 440.

The carrier phase recovery and correction module 440 may be configured to correct the carrier frequency and/or phase in the received data streams from the MIMO and FIR block 430 based on the carrier frequency and/or phase estimation from the MIMO and FIR block 430. The carrier phase recovery and correction module 440 may be configured to perform fine frequency correction/estimation, as discussed in greater detail below. Additionally, the carrier phase recovery and correction module 440 may be configured to perform carrier phase recovery. The carrier phase recovery and correction circuit 440 may correct the timing of the received component signals, which may be offset due to fiber dispersion and/or PMD effect, e.g., as caused by the optical channel. In some embodiments, the carrier phase recovery and correction circuit 440 may implement phase correction using one or more of the techniques described in U.S. patent application Ser. No. 13/179,300, which is incorporated herein by reference as if reproduced in its entirety.

The decision circuit 460 may be configured to obtain carrier phase information, which may be used for carrier frequency/phase correction in the carrier phase recovery and correction module 440. The carrier phase information may be obtained from the input and output of the decision circuit 460, where a carrier phase error may be determined by the difference between the input and output of the decision circuit 460, e.g., similar to the feed-forward phase correction in the carrier phase recovery receiver 100.

Figure 5:
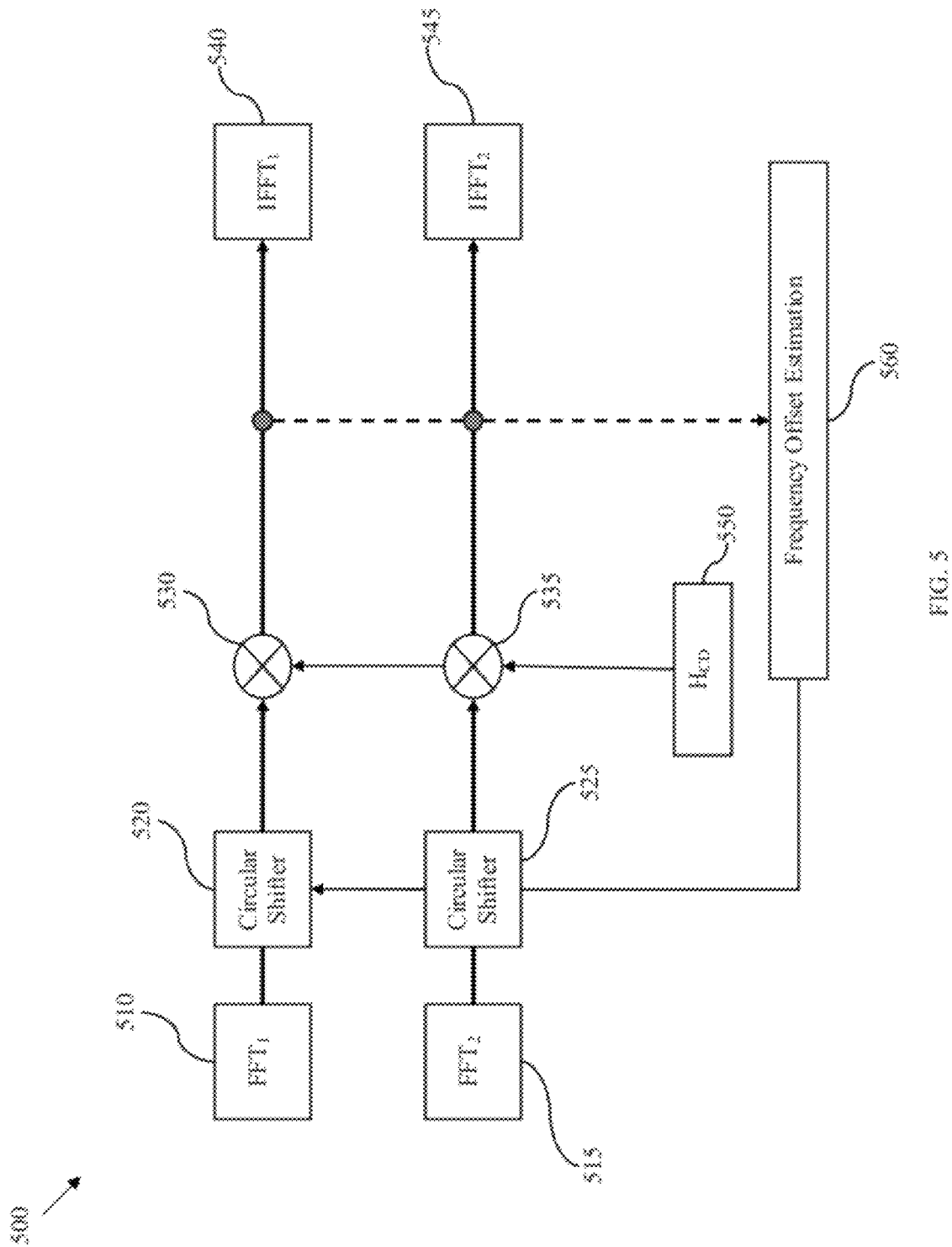
FIG. 5 is a schematic diagram of an embodiment of a FDEQ module.

FIG. 5 illustrates an embodiment of a FDEQ 500 for implementing a first stage of coarse frequency offset correction, which may be configured similarly to the FDEQ 420 in the receiver DSP unit 400. The FDEQ 500 may comprise a first fast Fourier Transform unit ($FFT_1$) 510, a second fast Fourier Transform unit ($FFT_2$) 515, a first circular shifter 520, a second circular shifter 525, a first signal combiner or optical coupler 530, a second combiner or optical coupler 535, a first inverse Fourier Transform unit ($IFFT_1$) 540, a second inverse Fourier Transform unit ($IFFT_2$) 545, a chromatic dispersion compensation unit 550, and a frequency offset estimation unit 560, which may be arranged as shown in FIG. 5.

The $FFT_1$ 510 and the $FFT_2$ 515 may be configured to receive a Q component and an I component, respectively, for one of the polarization components, e.g., the X polarization component. For instance, the $FFT_1$ 510 may be configured to receive an XQ component signal, while the $FFT_2$ 515 may be configured to receive an XI component signal. The $FFT_1$ 510 and the $FFT_2$ 515 may be configured to transform the XQ component signal and the XI component signal, from the time domain to the frequency domain, and subsequently forward the XQ component signal and the XI component signal to the first circular shifter 520 and the second circular shifter 525, respectively. In an embodiment, the FDEQ 500 may sample the component signals comprising a signal frequency ($f_{signal}$) at a rate of about T/2 (where T is the component signal's period) to generate about N acquisition points (where N is an integer greater than zero), thereby achieving a frequency bin resolution of approximately $2f_{signal}/N$.

The first circular shifter 520 and the second circular shifter 525 may comprise any device or component capable of removing a coarse frequency offset in a component signal according to a control signal, e.g., a coarse frequency offset indication. Specifically, the first circular shifter 520 and the second circular shifter 525 may remove a frequency offset in the XQ component signal and the XI component signal, respectively, according to a control signal received from the Frequency Offset Estimation unit 560. Subsequently, the first circular shifter 520 and the second circular shifter 525 may forward the XQ component signal and the XI component signal to the first signal combiner 530 and the second signal combiner 535, respectively. The first signal combiner 530 and the second signal combiner 535 may combine the XQ component signal and the XI component signal with a signal from the chromatic dispersion compensation module 550 to compensate for chromatic dispersion in the XQ component signal and the XI component signal, e.g., that occurred during propagation through the network. Subsequently, the XQ component signal and the XI component signal may be forwarded to the IFFT$_1$ 540 and the IFFT$_2$ 545, respectively, where they may be transformed back into the time domain.

Prior to reaching the IFFT$_1$ 540 and the IFFT$_2$ 545, the XQ component signal and the XI component signal may be sampled by the Frequency Offset Estimation unit 560 such that a frequency offset estimation for each signal may be performed. Specifically, the Frequency Offset Estimation unit 560 may estimate the frequency offset for the XQ component signal and the XI component signal by monitoring the time domain auto-correlation peak of the header in the signal components and controlling the first circular shifter 520 and the second shifter 525, accordingly. Determining the time domain auto-correlation peak of the header may comprise finding which bins of the FFT component signal have the highest correlation peak for a received unique word in the header. The received unique word may be a distorted version of the transmitted unique word, e.g., due to signal distortions from the propagation channel), but may nonetheless have a high degree of correlation to the transmitted unique word. Hence, the point of highest correlation (e.g., in the time domain) may correspond to the approximate location of the unique word in the received optical component signal, and thus may be used as a reference point in the received signal. In an embodiment, determining the time domain auto-correlation peak of the header may comprise three steps: multiplying N frequency domain samples of the unique word by the word or header that may be padded with zeros, performing an IFFT on the result; and determining the intensity peak of the IFFT output.

Figure 6:
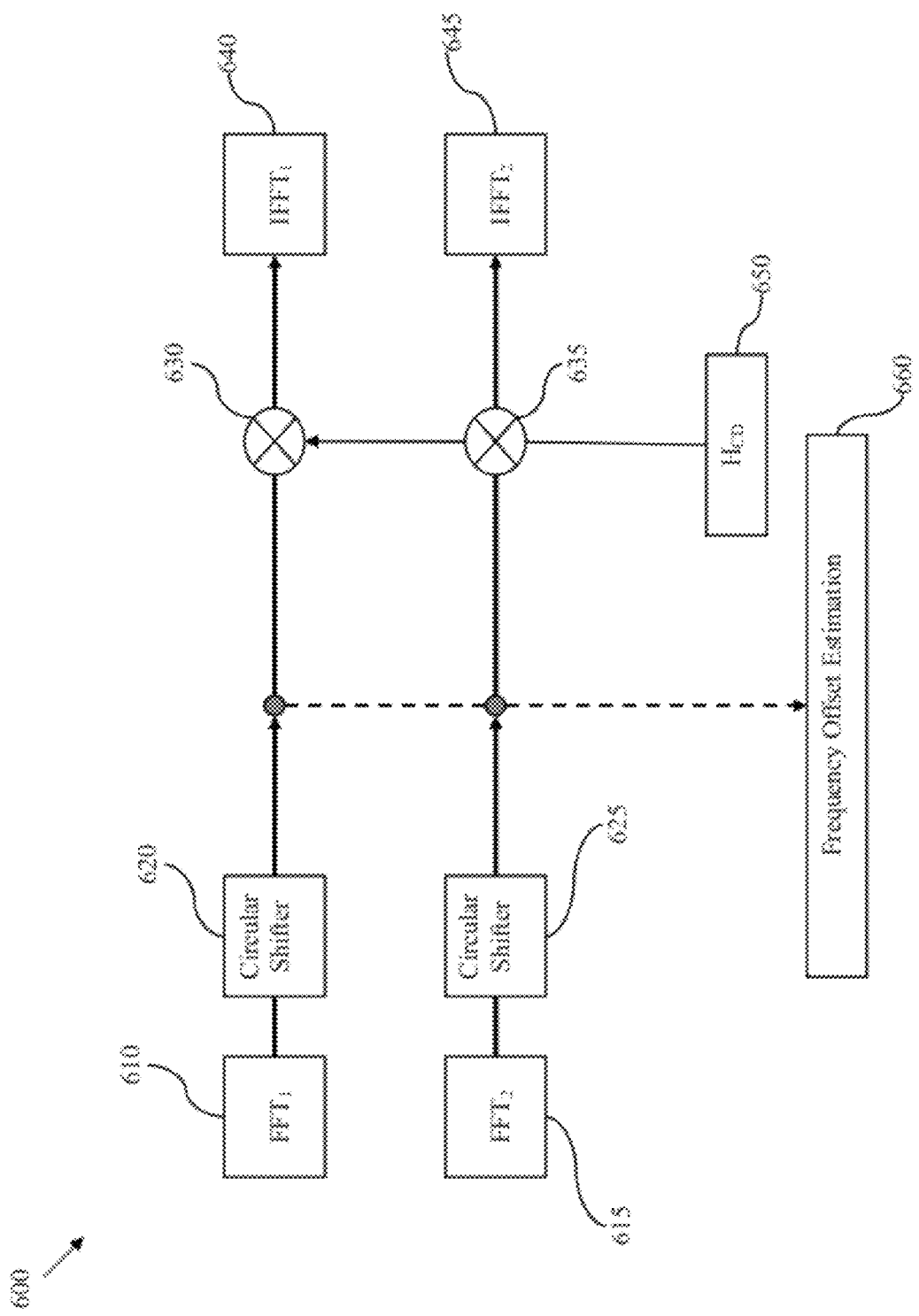
FIG. 6 is a schematic diagram of another embodiment of a FDEQ module.

FIG. 6 illustrates another embodiment of a FDEQ 600 for implementing coarse frequency offset correction, which may be configured similarly to the FDEQ 420 in the receiver DSP unit 400. The FDEQ 600 may comprise an FFT$_1$ 610, an FFT$_2$ 615, a first circular shifter 620, a second circular shifter 625, a first signal combiner or optical coupler 630, a second combiner or optical coupler 635, an IFFT$_1$ 640, an IFFT$_2$ 645, a chromatic dispersion compensation unit 650, and a frequency offset estimation unit 660, which may be arranged as shown in FIG. 6 and configured similarly to the corresponding components in the FDEQ 500.

Unlike the FDEQ 500, the FDEQ 600 may perform coarse frequency offset estimation before the component signals are compensated for chromatic dispersion. Specifically, the frequency offset estimation unit 660 may sample the XQ component signal and the XI component signal before they are processed by the chromatic dispersion compensation unit 650. The Frequency Offset Estimation unit 660 may estimate the frequency offset for the XQ component signal and the XI component signal by monitoring the total power spectrum component of the header, e.g., rather than using the time domain auto-correlation peak of the header as is done in the FDEW 500. For example, the header may be a unique word comprising about 16 bits such as (1001100110011001)+j×(1100110011001100). The header may be considered as one QPSK symbol spinning at a frequency of about $f_{signal}/4$, and may comprise a lower side band set to zero, see, e.g., FIG. 9 infra. The location of the total power spectrum peak may be used to estimate a coarse frequency offset for the signal. The estimated frequency offset may then be used to control the first circular shifter 620 and the second circular shifter 625 to remove the coarse frequency offset from the signal.

Upon being received at the IFFT$_1$ 640 and the IFFT$_2$ 645, the XQ component signal and the XI component signal may be transformed back into the time domain. Subsequently, the IFFT$_1$ 640 and the IFFT$_2$ 645 may forward the XQ component signal and the XI component signal to a MIMO and FIR module, e.g., the MIMO FIR 430 of the receiver DSP unit 400.

Figure 7:
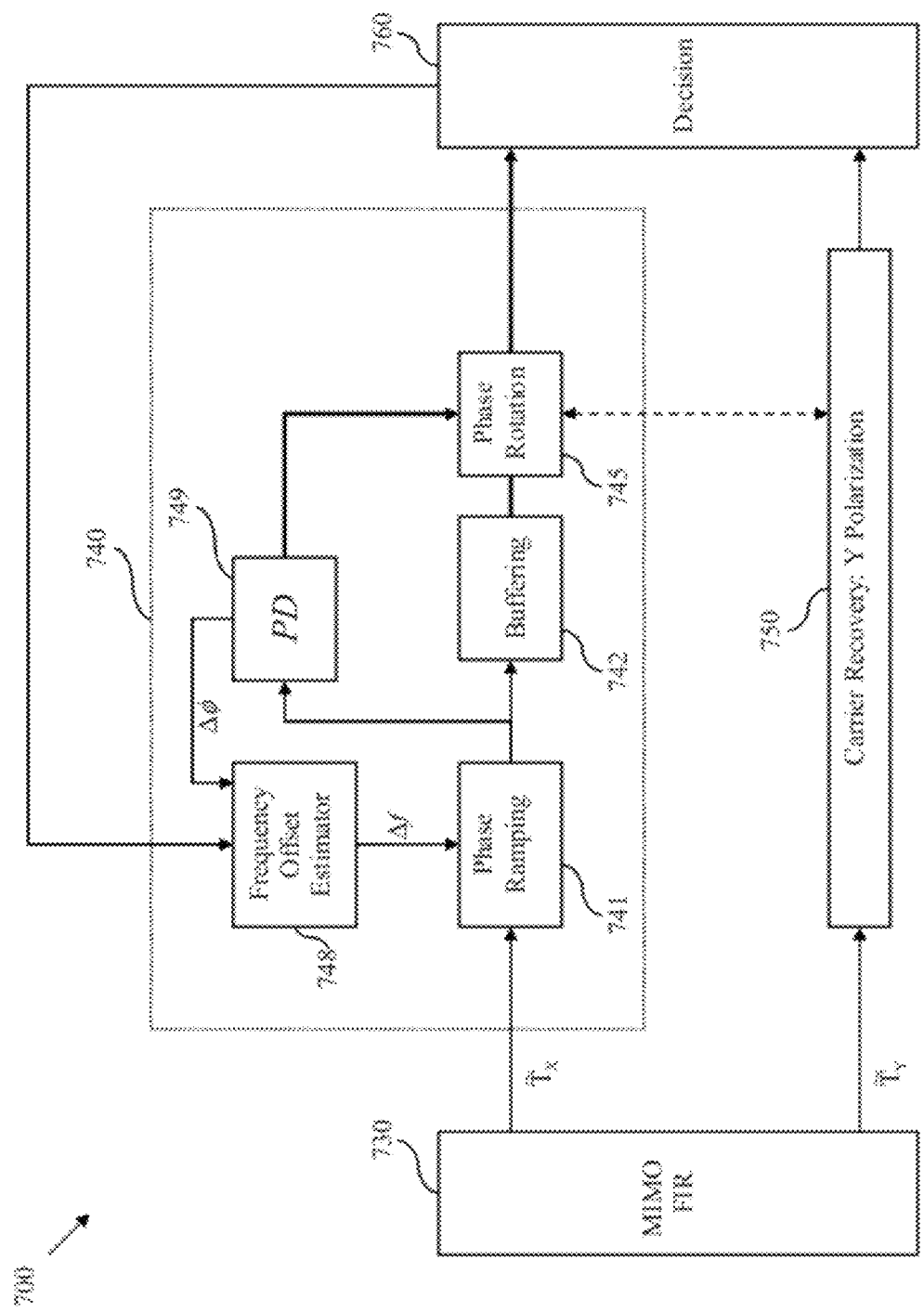
FIG. 7 is a schematic diagram of an embodiment of a frequency/phase correction and recovery circuit.

FIG. 7 illustrates an embodiment of a circuit 700 for implementing fine frequency offset correction and carrier phase recovery. The circuit 700 may comprise a MIMO and FIR block 730, a first carrier phase recovery block 740, a second carrier phase recovery block 750, and a decision circuit 760 that may be arranged as shown in FIG. 7. The MIMO and FIR block 730 and the decision circuit 760 may be configured similarly to the MIMO and FIR block 430 and the decision circuit 460 of the receiver DSP unit 400. The MIMO and FIR block 730 may be configured to combine corresponding Q and I component signals into an orthogonal polarization component signal (e.g., XQ and XI into an X polarization component signal, and YQ and YI into a Y polarization component signal), as well as perform some frequency correction on the Q and I component signals and/or on the orthogonal polarization component signal to partially compensate for channel distortion that occurred in the propagation medium. However, such compensation may be performed without substantially adjusting the carrier's phase (e.g., may be performed with carrier phase divergences). For instance, the corrected sample phase may still comprise the PSK data phase, laser phase noise, LO frequency offset (e.g., up to +/−600 MHz), Gaussian white noise, nonlinear phase noise, or combinations thereof. The MIMO and FIR block 730 may forward such samples of the X polarization component signal and the Y polarization component signal to corresponding carrier phase recovery and correction circuits, e.g., to the carrier phase recovery and correction module 440 which may implement fine frequency offset correction and carrier phase recovery. The X polarization component signal and/or Y polarization component signal may comprise time domain digital samples represented by the formula: $\tilde{T}=I+jQ$.

The first carrier phase recovery block 740 may comprise a phase ramping unit 741, a buffering block 742, a phase rotation block 745, a frequency offset estimator 748, and a phase detector (PD) 749, which may be arranged as shown in FIG. 7. The second carrier phase recovery block 760 may process the Y polarization component of the signals and may comprise similar components as the first carrier phase recovery block 740. The time domain digital samples of the X polarization component signal (X polarization samples) may be received by the phase ramping unit 741. The phase ramping unit 741 may correct the frequency/phase of the X polarization samples using a linear phase ramp corresponding to a fine frequency offset estimation, which may be provided by the frequency offset estimator 748 as discussed in greater detail below. Subsequently, the phase ramping unit 741 may forward the X polarization samples to the buffering unit 742, where the X polarization samples may be delayed for the time required for the PD 749 to detect one or more components of a phase shift in the X polarization samples. In an embodiment, the PD 749 may determine a phase derivative (Δφ) as described in U.S. patent application Ser. No. 13/179,300. The PD 749 may provide the Δφ and the phase error to the frequency offset estimator 748 and the phase rotation block 745, respectively. Once the phase error has been provided to the phase rotation block 745, the buffer 742 may forward the X polarization samples to the phase rotation block 745 for a phase adjustment based on the phase error information provided by the PD 749.

In an embodiment, the frequency offset estimator 748 may estimate a fine frequency offset ($\Delta f_{fine}$), and then provide that $\Delta f_{fine}$ to the phase ramping unit 741. The phase ramping unit 741 may use the $\Delta f_{fine}$ to determine a linear phase ramp, which may be used to remove or further reduce the frequency offset in the X polarization samples (e.g., to about +/−25 MHz). The frequency offset estimator 748 may estimate the $\Delta f_{fine}$ using either a direct estimation technique or a digital frequency sweep estimation technique.

The direct estimation technique may estimate $\Delta f_{fine}$ for each symbol interval (T) based on the linear relationship between Δφ and Δf, which may be defined by the formula:

$$\Delta\phi = \frac{2\pi\Delta f_{fine}}{T}.$$

For instance, the frequency offset estimator 748 may receive the Δφ from the PD 749, and then estimate the $\Delta f_{fine}$ according to the formula:

$$\Delta f_{fine} = \frac{T\Delta\phi}{2\pi}.$$

The PD 749 may determine the Δφ according to a unique word in the header of the corresponding data block. For instance, the PD 749 may perform a first order approximation of Δφ based on a known transmitted word ($T_H$) and a known received word ($R_H$), where $T_H=T_0\times T_1$ and $R_H=R_0\times R_1=T_0^{j\Phi}*T_0^{j(\Phi+\Delta\phi)}$. As such, the PD 749 may approximate Δφ according to the formula: $\Delta\phi=(R_1T_1^*)\cdot(T_0R_0^*)^*$, where * denotes conjugation.

Alternatively, a digital frequency sweep estimation technique may be used to estimate the $\Delta f_{fine}$ by performing a digital frequency sweep over a range of $\Delta f_{fine}$ values to find a $\Delta f_{fine}$ value that yields a minimum residual phase power. In other words, the frequency offset estimator 748 may use the minimum residual phase power as a lock indicator for estimating the $\Delta f_{fine}$. In an embodiment, the minimum residual phase power may be provided by the decision circuit 760, and may be expressed in terms of the root means square (rms) power ($P_{rms}$). In an embodiment, the $P_{rms}$ may be defined by the formula: $P_{rms}=\text{mod}(2\pi\Delta f_{fine}t+\phi_n,\pi/2)$, where t corresponds to the time interval for the symbol. The $\Delta f_{fine}$ may be matched when the phase of the data points stops spinning, and the residual phase power reaches a minimum. For instance, the $\Delta f_{fine}$ may be proportional to the $P_{rms}$, and as such the frequency offset estimator 748 may track the $P_{rms}$ during the digital frequency sweep of the $\Delta f_{fine}$ to determine what value of $\Delta f_{fine}$ yields a minimum value for the $P_{rms}$. The value of $\Delta f_{fine}$ that generates the minimum $P_{rms}$ may be sent to the phase ramping unit 741.

The digital frequency sweep technique discussed herein may perform favorably when compared to other known hardware feasible CR that compensate for small frequency wandering and phase noise, such as the Costa loop method, as described in U.S. Pat. No. 7,606,498 entitled "Carrier Recovery in a Coherent Optical Receiver" by Wu, et al., and the Viterbi and Viterbi (V&V) method, as described in OSA JLT vol. 32, issue 2, both of which are incorporated herein by reference as if reproduced in their entirety.

Figure 8:
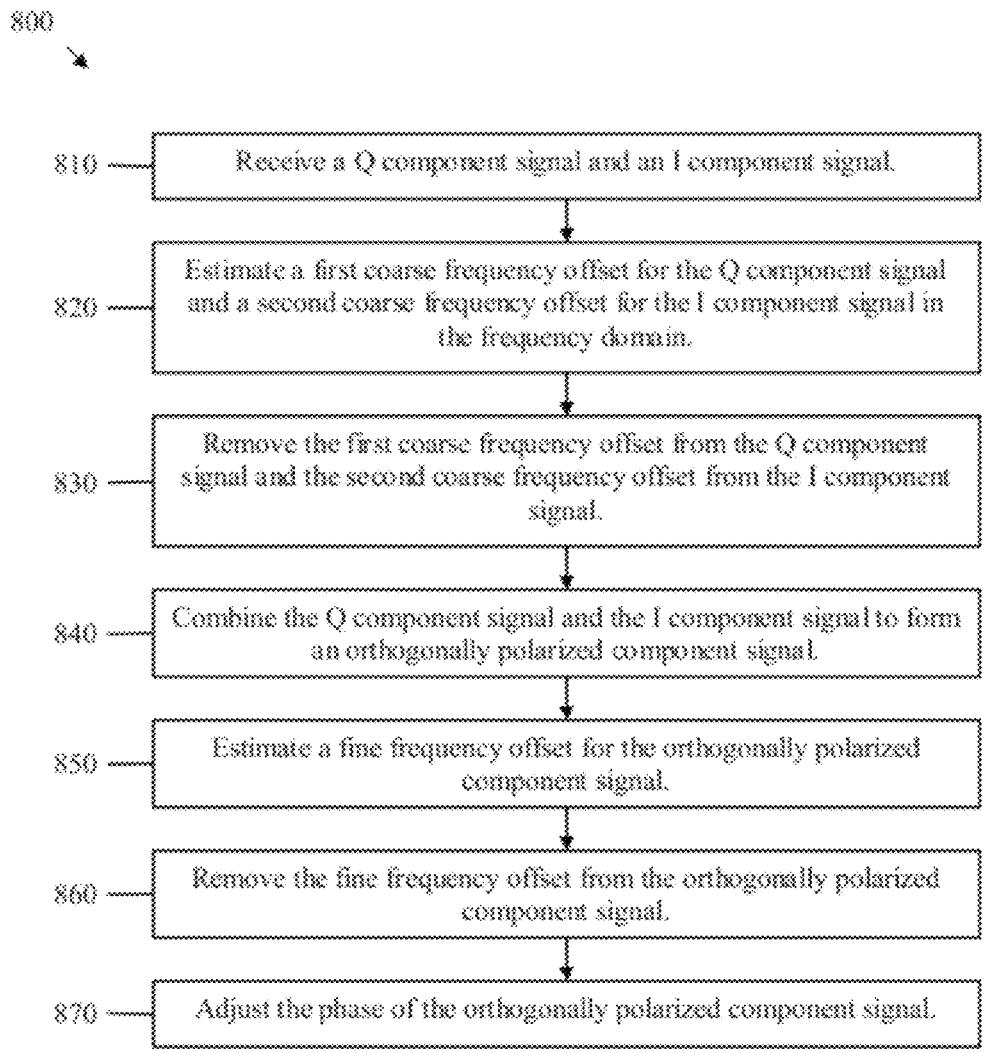
FIG. 8 is a flowchart of an embodiment of a method for providing frequency offset correction and phase recovery in a coherent optical communications system.

FIG. 8 illustrates an embodiment of a method 800 for performing frequency and phase compensation in a coherent optical receiver. The method 800 may be implemented by the DSP receive unit 400, e.g., using the FDEQs 421-422, the MIMO and FIR 430, and the carrier phase recovery and correction module 440. At step 810, a Q component signal and an I component signal may be received. The Q component signal and the I component signal may correspond to the same polarization component signal (e.g., the X polarization component signal or the Y component signal). At step 820, a first coarse frequency offset for the Q component signal and a second coarse frequency offset for the I component signal may be estimated in the frequency domain. The first coarse frequency offset and second coarse frequency offset may be estimated prior to chromatic dispersion compensation or after chromatic dispersion compensation, e.g., using the FDEQ 500 or the FDEQ 600. At step 830, the first coarse frequency offset and second coarse frequency offset may be removed from the Q component signal and the I component signal, respectively, e.g., by circular shifting the component signals. At step 840, the Q component signal and the I component signal may be combined to form an orthogonally polarized component signal, e.g., by a MIMO and FIR module. At step 850, a fine frequency offset for the orthogonally polarized component signal may be estimated. At step 860, the fine frequency offset may be removed from the orthogonally polarized component signal, e.g., using the phase ramping unit 741 and the frequency offset estimator 748. At step 870, the coherent optical receiver may adjust the orthogonally polarized component signal's phase, e.g., using the components of the circuit 700.

Figure 9:
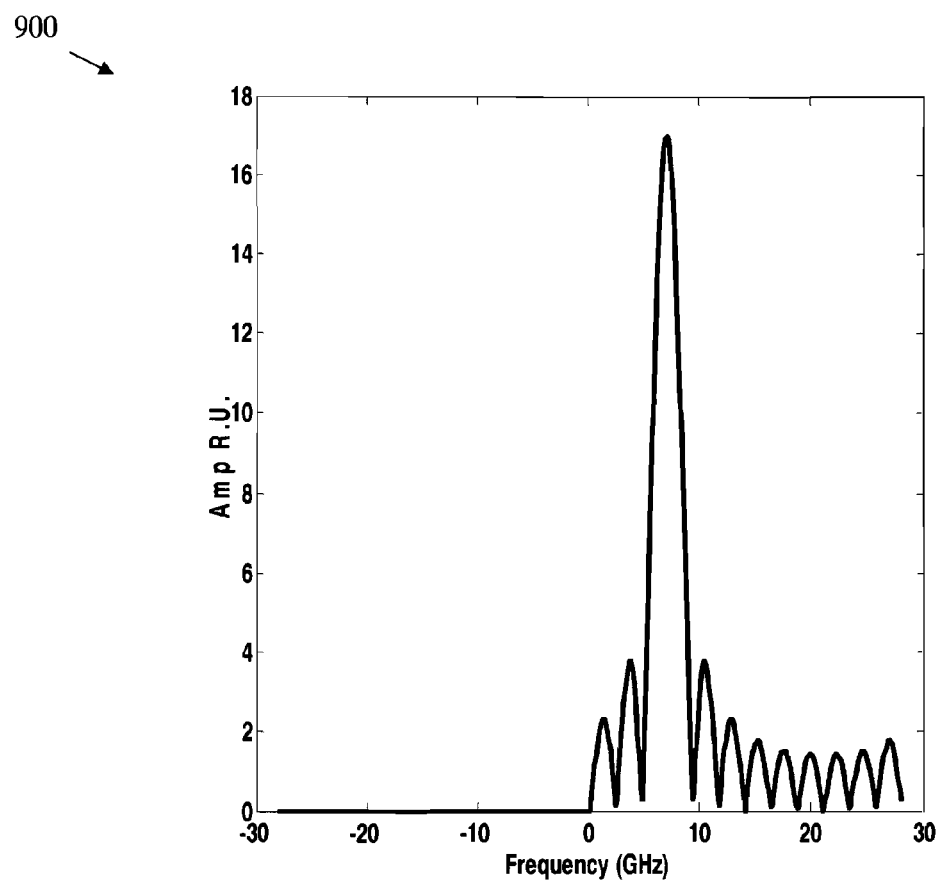
FIG. 9 is a chart of an embodiment of a power spectrum indicating a coarse frequency offset.

FIG. 9 shows an example of a power spectrum 900 obtained for a data block header (e.g., header 362). The power spectrum 900 may indicate a frequency offset where the lower side band may be at about zero GHz. Without frequency offset, the received signal (time domain) may be expressed as: $S_x=S_0^{j\cdot 2\pi f_H t}$. However, with typical LO frequency offset, the received signal (time domain) may be expressed as: $R_x=S_0^{j\cdot 2\pi(f_H+\Delta f)t}$. The LO frequency offset (e.g., Δf) may be obtained by locating the peak in the power spectrum 900, e.g., at about seven or about eight GHz. This may correspond to a coarse frequency offset in the signal, and may be compensated for using the coarse frequency offset techniques described above.

Figure 10:
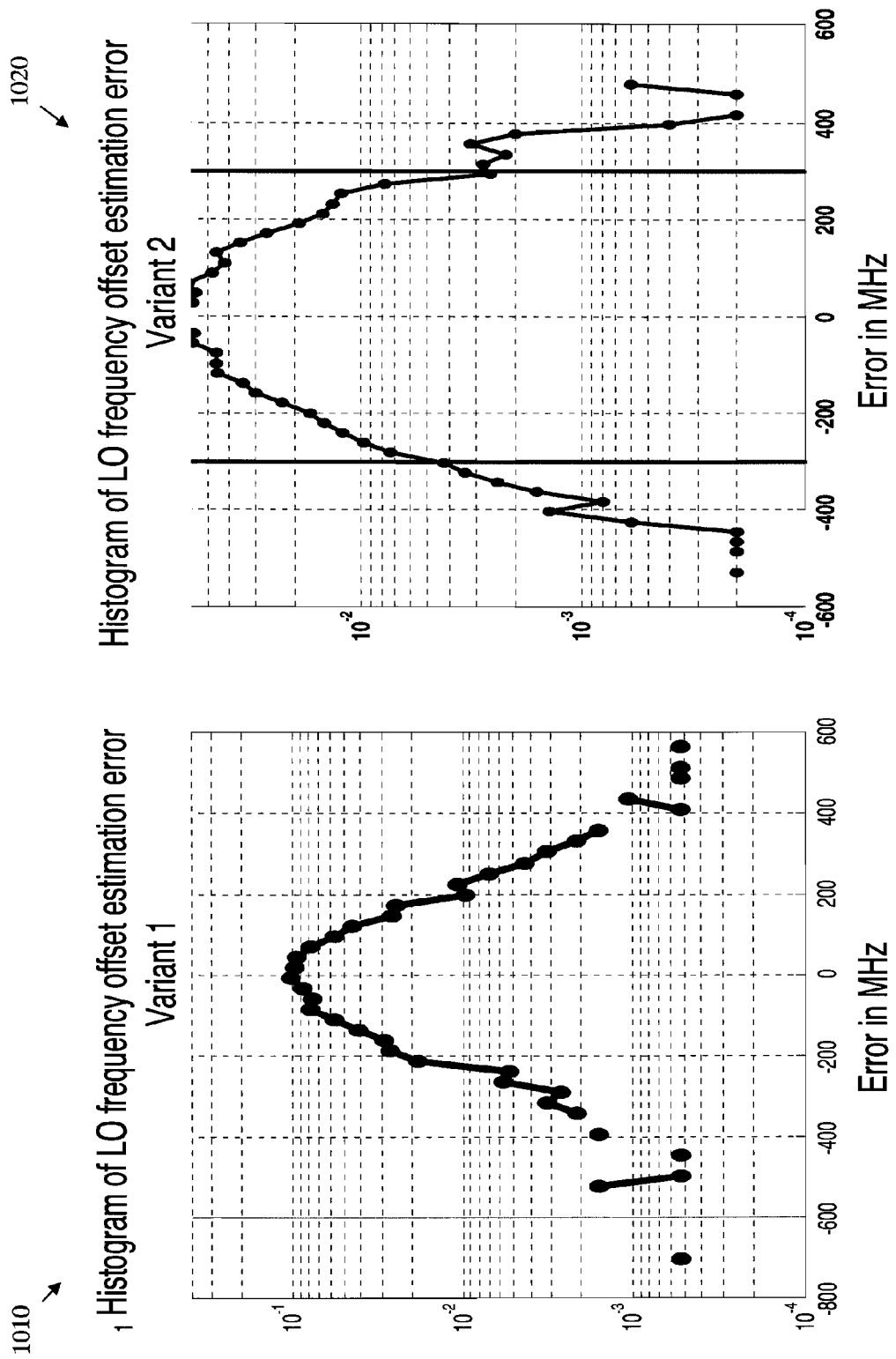
FIG. 10 is a chart showing frequency offset estimation errors obtained using coarse frequency offset estimation techniques disclosed herein.

FIG. 10 illustrates a first histogram that shows LO frequency offset estimation error 1010 using the coarse frequency offset estimation technique implemented by the FDEQ 500. FIG. 10 also illustrates a second histogram that shows LO frequency offset estimation error 1020 for using the coarse frequency offset estimation technique implemented by the FDEQ 600. The estimation errors 1010 and 1020 were obtained from respective simulations during which the channel conditions were randomly selected and emulated based on the physical properties of the FDEQ 500 and the FDEQ 600, respectively. The LO frequency offset was also randomized, with an about zero mean uniform distribution covering a range of about +/−2.5 GHz. The estimation 1010 was obtained using about 1,890 events (e.g., FFT acquisition points), while the estimation 1020 was obtained using about 5,000 events (e.g., FFT acquisition points). After frequency domain compensation, both of the errors 1010 and 1020 comprise less than about one percent probability of a frequency offset greater than about +/−600 MHz. Thus, the simulations suggest that the FDEQ 500 and FDEQ 600 schemes may be effective in providing coarse frequency adjustment in coherent optical receivers.

Figure 11:
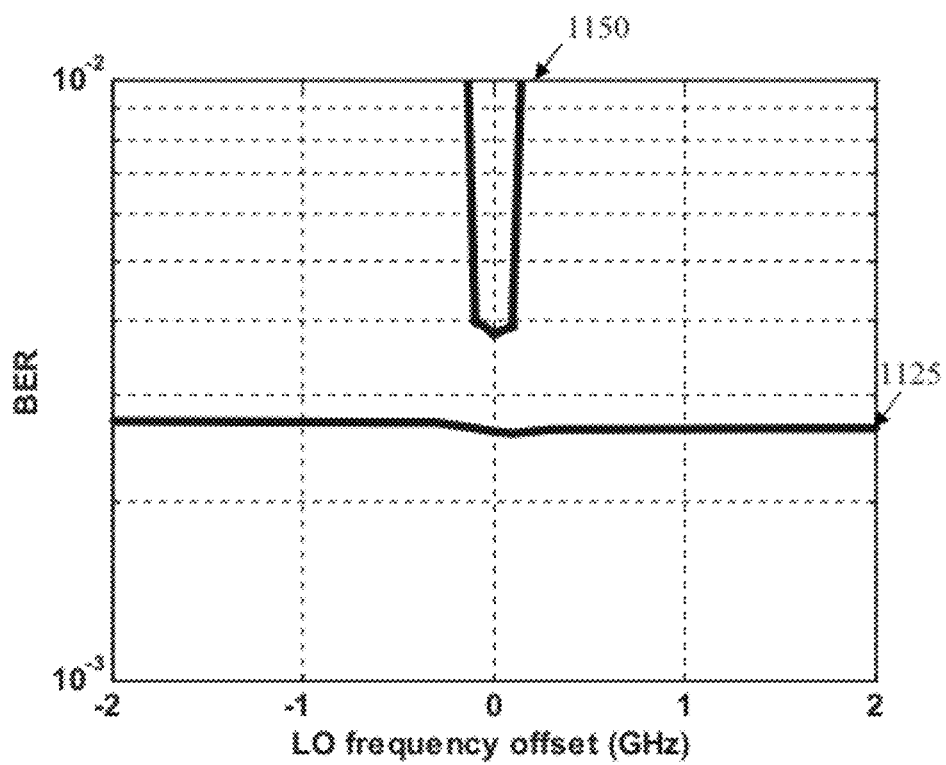
FIG. 11 is a chart comparing BER performance curves.

FIG. 11 shows a BER performance curve 1125 obtained using the described frequency/phase recovery and correction schemes, e.g., according to the FDEQ 500 or 600 and the circuit 700, and a BER performance curve 1150 obtained using the Costa loop method presented above. The simulation was performed using a laser having an about 500 kilohertz (kHz) linewidth output and an LO frequency offset range of about +/−2 GHz. As shown, the BER performance curve 1125 reveals substantially better performance than the BER performance curve 1150 throughout the spectrum interval of BER values, and especially when the overall frequency differential is greater than about +/−100 MHZ. Further, the BER performance curve 1125 reveals a substantially broader LO frequency offset range that may be applicable to the frequency/phase recovery correction scheme described herein. Thus, the schemes described herein may perform better than other known methods of frequency offset compensation.

Figure 12:
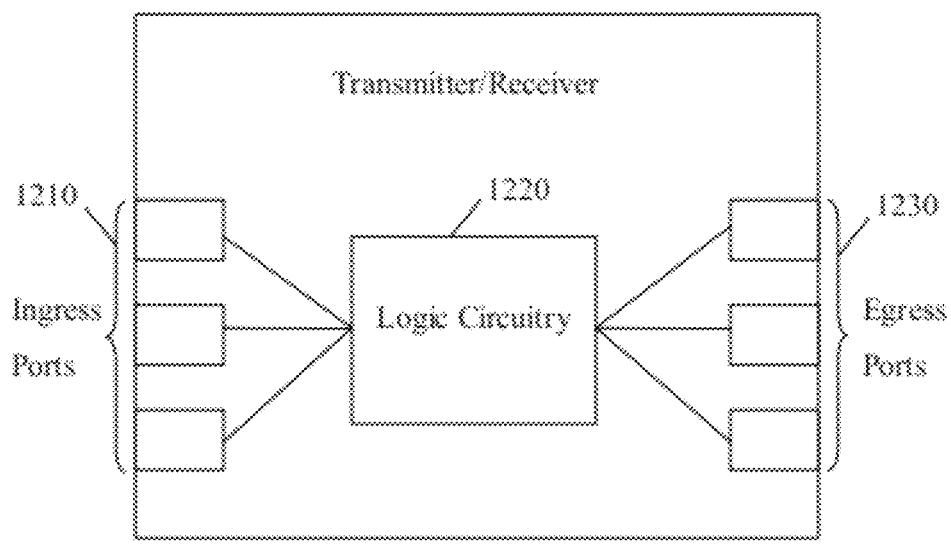
FIG. 12 is a schematic diagram of an embodiment of a transmitter/receiver unit.

FIG. 12 illustrates an embodiment of a transmitter/receiver unit 1200, which may be any device that transports packets through a network. For instance, the transmitter/receiver unit 1200 may be located at a family member device, a family gateway, a local family space, and/or a family space on cloud. The transmitted/receiver unit 1200 may comprise one or more ingress ports or units 1210 for receiving packets, objects, or TLVs from other network components, logic circuitry 1220 to determine which network components to send the packets to, and one or more egress ports or units 1230 for transmitting frames to the other network components.

Figure 13:
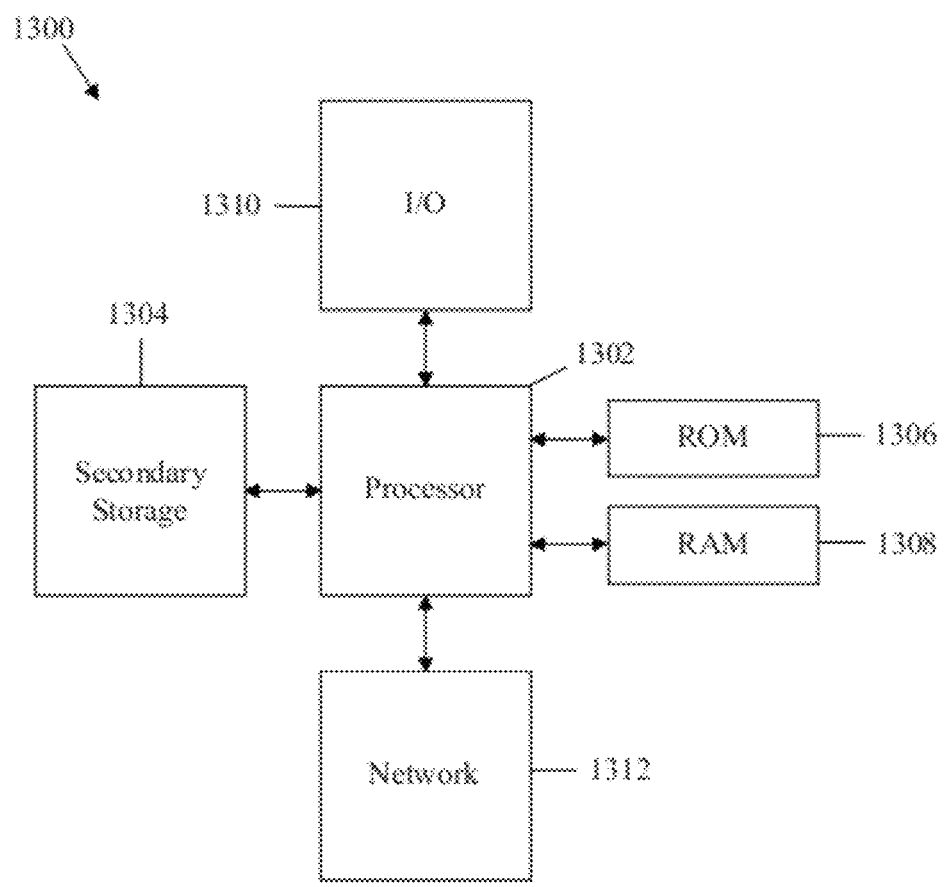
FIG. 13 is an embodiment of a general-purpose computer system.

FIG. 13 illustrates a typical, general-purpose computer, suitable for implementing one or more embodiments of any component disclosed herein. The computer 1300 includes a processor 1302 (which may be referred to as a central processor unit or CPU) that is in communication with memory devices including secondary storage 1304, read only memory (ROM) 1306, random access memory (RAM) 1308, input/output (I/O) devices 1310, and network connectivity devices 1312. The processor may be implemented as one or more CPU chips, or may be part of one or more application specific integrated circuits (ASICs).

The secondary storage 1304 is typically comprised of one or more disk drives or tape drives and is used for non-volatile storage of data and as an over-flow data storage device if RAM 1308 is not large enough to hold all working data. Secondary storage 1304 may be used to store programs that are loaded into RAM 1308 when such programs are selected for execution. The ROM 1306 is used to store instructions and perhaps data that are read during program execution. ROM 1306 is a non-volatile memory device that typically has a small memory capacity relative to the larger memory capacity of secondary storage 1304. The RAM 1308 is used to store volatile data and perhaps to store instructions. Access to both ROM 1306 and RAM 1308 is typically faster than access to secondary storage 1304.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
 a fast Fourier transform (FFT) module configured to transform a time domain optical signal into a frequency domain optical signal;
 a circular shifter coupled to the FFT module and configured to provide coarse frequency offset compensation to the frequency domain optical signal based on an estimated frequency offset;
 a frequency offset estimation module coupled to the circular shifter and configured to provide the estimated frequency offset based on a power spectrum of the frequency domain optical signal or a data block header autocorrelation of the time domain optical signal; and a circuit indirectly coupled to the circular shifter and comprising:
- a multiple-input and multiple-output (MIMO) and finite impulse response (FIR) module
- a phase ramping module coupled to the MIMO and FIR module,
- a phase rotation module indirectly coupled to the phase ramping module, and
- a phase detector module coupled to the phase ramping module and the phase rotation module.

2. The apparatus of claim 1 further comprising:
an optical coupler coupled to the circular shifter; and
a chromatic dispersion compensation module coupled to the optical coupler and configured to provide chromatic dispersion compensation to the frequency domain optical signal.

3. The apparatus of claim 2 further comprising:
an Inverse FFT (IFFT) module coupled to the optical coupler and the circuit and configured to transform the frequency domain optical signal into a time domain optical signal subsequent to chromatic dispersion compensation and coarse frequency offset compensation.

4. The apparatus of claim 3, wherein the estimated frequency offset is provided by the frequency offset estimation module after chromatic dispersion compensation, and wherein the frequency offset estimation module is coupled to the optical coupler and the IFFT.

5. The apparatus of claim 4, wherein the estimated frequency offset is provided based on detecting a peak in the power spectrum of the frequency domain optical signal.

6. The apparatus of claim 2, wherein the estimated frequency offset is provided by the frequency offset estimation module before chromatic dispersion compensation, and wherein the frequency offset estimation module is coupled to the optical coupler.

7. The apparatus of claim 6, wherein the estimated frequency offset is provided based on detecting a peak in the data block header autocorrelation.

8. The apparatus of claim 1, wherein the data block header of the time domain optical signal is obtained by transforming the frequency domain optical signal into the time domain optical signal using an IFFT.

9. The apparatus of claim 1, wherein the frequency domain optical signal comprises either a quadrature (Q) component or an in-phase (I) component of an orthogonal linear polarization component signal that is modulated according to a quadrature phase shift keyed (QPSK) modulation scheme, and wherein the time domain optical signal comprises a data block header that comprise about 16 bits.

10. A method of frequency correction and carrier recovery in an optical network, the method comprising:
estimating, by a frequency domain equalizer (FDEQ), a first coarse frequency offset of a quadrature (Q) component signal and a second coarse frequency offset of an in-phase (I) component signal in the frequency domain, wherein the first coarse frequency offset is estimated by finding a first time domain auto-correlation peak of a header of the Q component signal by:
multiplying N frequency domain samples of the header by the header to produce a result
performing an inverse fast Fourier transform (IFFT) of the result to produce an output, and
determining an intensity peak of the output;

removing, by the FDEQ, the first coarse frequency offset from the Q component signal and the second coarse frequency offset from the I component signal;

combining, by a multiple-input and multiple-output (MIMO) and finite impulse response (FIR) device, the Q component signal and the I component signal to provide an optical signal;

estimating, by a carrier phase recovery and correction component, a fine frequency offset of the optical signal in the time domain;

removing, by the carrier phase recovery and correction component, the fine frequency offset from the optical signal; and recovering, by the carrier phase recovery and correction component, the phase of the optical signal after removing the fine frequency offset from the optical signal.

11. The method of claim 10, wherein the fine frequency offset is estimated using a direct estimation technique based on a detected phase derivative (Δφ) according to the formula:

$$\Delta f = \frac{T\Delta\phi}{2\pi},$$

where Δf is the fine frequency offset and T is a symbol interval corresponding to the optical signal.

12. The method of claim 11, wherein the Δφ is provided by a phase detector (PD), and wherein the PD determines the Δφ by comparing a unique received word ($R_H$) to a known transmitted word ($T_H$).

13. The method of claim 10, wherein the first coarse frequency offset is estimated after the Q component signal is compensated for chromatic dispersion.

14. The method of claim 10, wherein the fine frequency offset is estimated using a digital frequency sweep technique that comprises determining a value for the fine frequency offset that minimizes a residual phase power.

15. A method of frequency correction and carrier recovery in an optical network, the method comprising:
estimating, by a frequency domain equalizer (FDEQ), a first coarse frequency offset of a quadrature (Q) component signal and a second coarse frequency offset of an in-phase (I) component signal in the frequency domain;

removing, by the FDEQ, the first coarse frequency offset from the Q component signal and the second coarse frequency offset from the I component signal;

combining, by a multiple-input and multiple-output (MIMO) and finite impulse response (FIR) device, the Q component signal and the I component signal to provide an optical signal;

estimating, by a carrier phase recovery and correction component, a fine frequency offset of the optical signal in the time domain;

removing, by the carrier phase recovery and correction component, the fine frequency offset from the optical signal; and recovering, by the carrier phase recovery and correction component, the phase of the optical signal after removing the fine frequency offset from the optical signal, wherein the fine frequency offset is estimated using a direct estimation technique based on a detected phase derivative (Δφ) according to the formula:

$$\Delta f = \frac{T\Delta\phi}{2\pi},$$

where $\Delta f$ is the fine frequency offset and T is a symbol interval corresponding to the optical signal, wherein the $\Delta\phi$ is provided by a phase detector (PD), and wherein the PD determines the $\Delta\phi$ by comparing a unique received word ($R_H$) to a known transmitted word ($T_H$), wherein the $R_H$ comprises: a first real component ($R_0$) that is located in a header of the Q component signal and a first imaginary component ($R_1$) that is located in the header of the I component signal, wherein the $T_H$ comprises a second real component ($T_0$) and a second imaginary component ($T_1$), and wherein the $\Delta\phi$ is determined according to the formula: $\Delta\phi = (R_1 T_1{}^*)\cdot(T_0 R_0{}^*)^*$, where * denotes conjugation.

16. A method of frequency correction and carrier recovery in an optical network, the method comprising:

estimating, by a frequency domain equalizer (FDEQ), a first coarse frequency offset of a quadrature (Q) component signal and a second coarse frequency offset of an in-phase (I) component signal in the frequency domain;

removing, by the FDEQ, the first coarse frequency offset from the Q component signal and the second coarse frequency offset from the I component signal;

combining, by a multiple-input and multiple-output (MIMO) and finite impulse response (FIR) device, the Q component signal and the I component signal to provide an optical signal;

estimating, by a carrier phase recovery and correction component, a fine frequency offset of the optical signal in the time domain;

removing, by the carrier phase recovery and correction component, the fine frequency offset from the optical signal; and recovering, by the carrier phase recovery and correction component, the phase of the optical signal after removing the fine frequency offset from the optical signal, wherein the first coarse frequency offset is estimated before the Q component signal is compensated for chromatic dispersion, and wherein the first coarse frequency offset is determined by:
monitoring a total power spectrum component of a header of the Q component signal;
setting a lower side band of the total power spectrum component to about zero; and
finding a difference between the lower side band and a spectrum peak of the total power spectrum component, wherein the first coarse frequency offset is about equal to the difference.

17. A method of frequency correction and carrier recovery in an optical network, the method comprising:

estimating, by a frequency domain equalizer (FDEQ), a first coarse frequency offset of a quadrature (Q) component signal and a second coarse frequency offset of an in-phase (I) component signal in the frequency domain;

removing, by the FDEQ, the first coarse frequency offset from the Q component signal and the second coarse frequency offset from the I component signal;

combining, by a multiple-input and multiple-output (MIMO) and finite impulse response (FIR) device, the Q component signal and the I component signal to provide an optical signal;

estimating, by a carrier phase recovery and correction component, a fine frequency offset of the optical signal in the time domain;

removing, by the carrier phase recovery and correction component, the fine frequency offset from the optical signal; and recovering, by the carrier phase recovery and correction component, the phase of the optical signal after removing the fine frequency offset from the optical signal, wherein the fine frequency offset is estimated using a digital frequency sweep technique that comprises determining a value for the fine frequency offset that minimizes a residual phase power, wherein the residual phase power is a root mean squared (rms) power ($P_{rms}$) that is provided by a decision circuit, and wherein the decision circuit determines the $P_{rms}$ according to the formula: $P_{rms} = \mathrm{mod}(2\pi\Delta f t + \phi_n, \pi/2)$, where $\Delta f$ is the fine frequency offset, t corresponds to a time interval for the optical signal, $\phi_n$ is a phase derivative of the optical signal, and mod corresponds to a modulus operation.

18. A method comprising:

removing, by a frequency domain equalizer (FDEQ), a first coarse local oscillator (LO) frequency from a quadrature (Q) component signal and a second coarse LO frequency from an in-phase (I) component signal; and removing, by a circuit, a fine frequency LO offset from an orthogonal polarization component signal, wherein the orthogonal polarization component signal comprises a combination of the Q component signal and the I component signal, wherein the circuit comprises:
a multiple-input and multiple-output (MIMO) and finite impulse response (FIR) module,
a phase ramping module coupled to the MIMO and FIR module,
a phase rotation module indirectly coupled to the phase ramping module, and
a phase detector module coupled to the phase ramping module and the phase rotation module.

19. The method of claim 18, wherein removing the coarse LO frequency offset reduces a total LO frequency offset from a first amount that is greater than about +/−1 gigahertz (GHz) to a second amount that is less than about +/−600 megahertz (MHz), and wherein removing the fine frequency offset further reduces the total LO frequency from the second amount to a third amount that is less than about +/−50 MHz.

20. The method of claim 19, wherein the first amount is greater than about +/−2.5 GHz, and wherein the third amount is less than about +/−25 MHz.

* * * * *